United States Patent
Karczag et al.

(10) Patent No.: US 7,010,407 B2
(45) Date of Patent: Mar. 7, 2006

(54) ONE-WAY ORIFICE FOR CONTROLLING A SUPPLY FLOW RATE AND PERMITTING RAPID REVERSE FLOW

(75) Inventors: Dennis Karczag, Brighton, MI (US); Lee Becker, Canton, MI (US); Arnold Gomez-Mesquita, Warren, MI (US); Vladimir Yasnogorodskiy, Southfield, MI (US); Gerald Young, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

(21) Appl. No.: 10/661,953

(22) Filed: Sep. 12, 2003

(65) Prior Publication Data

US 2005/0060081 A1 Mar. 17, 2005

(51) Int. Cl.
*G06F 7/00* (2006.01)

(52) U.S. Cl. ............................................ 701/67
(58) Field of Classification Search ................ 701/67, 701/68; 192/53.2, 3.51, 3.55; 475/8, 31, 43
See application file for complete search history.

(56) References Cited

U.S. PATENT DOCUMENTS 6,003,887 A * 12/1999 Howard .................. 280/89.11

FOREIGN PATENT DOCUMENTS

| GB | 1155750 A | 6/1969 |
|---|---|---|
| GB | 2249610 A | 5/1992 |
| JP | 11132342 A | 5/1999 |
| WO | WO 00/45075 A1 | 8/2000 |

* cited by examiner

*Primary Examiner*—Yonel Beaulieu
(74) *Attorney, Agent, or Firm*—David B. Kelley; MacMillan, Sobanski & Todd

(57) ABSTRACT

In a hydraulic system for controlling the rate at which fluid flows to an oncoming clutch and for quickly disengaging the clutch, a source of pressurized fluid, a valve hydraulically connected to the fluid source including a spool for alternately opening and closing communication through the valve between the fluid source and the clutch, a seat located between the valve and the clutch, and a plate moveable by fluid flow in a first direction into contact with the seat and moveable by fluid flow in a second direction away from the seat, the plate having an orifice through which fluid enters the clutch when the plate contacts the seat, and openings through which fluid from the clutch passes when the plate is away from the seat. A tube, located between the plate and the clutch, includes a head adjacent the plate and is formed with the seat, and a shank having a passage hydraulically communicating with the clutch, the orifice being aligned with the passage when the plate contacts the seat.

20 Claims, 2 Drawing Sheets

ONE-WAY ORIFICE FOR CONTROLLING A SUPPLY FLOW RATE AND PERMITTING RAPID REVERSE FLOW

BACKGROUND OF THE INVENTION

The invention relates to fluid control and actuation systems. More particularly, it pertains to the application and release of friction elements used in a power transmission for a motor vehicle.

In an automatic transmission, the various speed ratios result by selectively engaging and disengaging friction elements, the hydraulically actuated clutches and brakes. The applied and released condition of the friction elements operate to interconnect and disconnect elements of the planetary gearsets in order to produce multiple forward drive gear ratios and reverse drive. The friction elements are applied and released in response to the pressurized and vented state of a hydraulic servo through which the friction elements are actuated.

The magnitude of torque transmitted by the various friction elements in the several gear ratios is reflected in the magnitude of pressure applied to each friction element. When the magnitude of transmitted torque is high, the magnitude of actuating pressure is high. Generally, during operation in the lowest forward drive gears and reverse gear, the transmitted torque magnitude is high. Generally, a control system for an automatic transmission produces line pressure in a range up to 300 psi.

The forward clutch is engaged in each of the forward gear ratios and is disengaged in reverse drive and the park and neutral ranges, which are selected by the vehicle operator's manual control of the gear selector lever. In order to produce smoothly controlled automatic gear ratio changes in an automatic transmission, especially gearshifts between the lowest forward gear ratios and between forward drive and reverse drive, it is important to control the rate of engagement of the oncoming friction elements, including the forward clutch, that produce those gear changes.

This can be accomplished by passing hydraulic fluid through an orifice whose diameter is sized to produce a relatively slow rate of fluid flow to the forward clutch. However, it is a requirement of transmission design that an automatic transmission must be capable of rock-cycling between forward drive and reverse drive in order to free the wheels from contact with a slippery surface. This imposes the additional requirement that hydraulic fluid be rapidly vented from the forward clutch. Therefore, an orifice that produces slow flow to engage the clutch will not allow rapid flow to vent the clutch.

There is need, therefore, for a low cost, reliable technique to both fill the forward clutch at a slow flow rate and to vent fluid from the clutch rapidly.

SUMMARY OF THE INVENTION

A principal advantage of the invention is the smooth, controlled rate of engagement of an oncoming clutch, the forward clutch of an automatic transmission, due to a relatively slow rate of fluid flow to the clutch through an orifice. A related advantage is the quick disengagement of the clutch that permits rock cycling between forward drive and reverse drive so the vehicle wheels can be freed from contact with a slippery surface.

An orifice plate according to this invention is produced at relatively low cost by a stamping process. The symmetric form of the plate assures errorless assembly; its efficient design and simplicity, fail-safe performance. Transmission fluid rushing into the clutch forces the orifice plate against a seat and requires that the fluid passes through the orifice formed in the plate. When the clutch is vented, flow in the opposite direction forces the plate away from the seat and allows fluid to flow freely past the plate though openings that remain open due to a standoff feature.

An orifice according to this invention produces these advantages in a hydraulic control system that controls the rate at which fluid flows in a first direction and permits rapid flow in a second direction. The orifice arrangement includes a passage surrounded by a seat, and a plate moveable by fluid flow into contact with the seat and moveable by fluid flow away from the seat. The plate has an orifice through which fluid enters the passage when the plate contacts the seat, and openings through which fluid from the passage passes when the plate is away from the seat.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
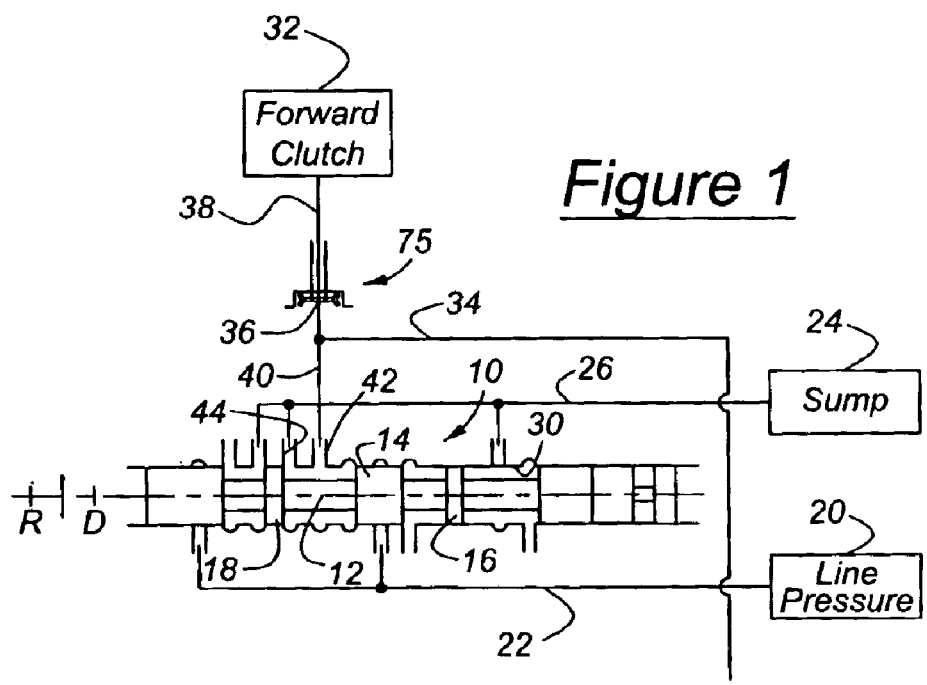
FIG. 1 is a schematic diagram of a portion of a hydraulic circuit for a power transmission to which the present invention can be applied.

Referring first to FIG. 1, a manual valve 10 for an automatic transmission includes a spool 12 formed with lands 14, 16, 18, which alternately open and close ports through the valve 10. A source of line pressure 20 is hydraulically connected to valve 10 by line 22, and a sump 24, or a low-pressure reservoir containing hydraulic fluid, is connected through passage 26 to the valve 10. The line pressure source produces a variable pressure, whose magnitude is in the range 10–300 PSI. The spool 12, which is located within a valve chamber 30 formed in a valve body surrounding the valve chamber, moves rightward and leftward from the position shown in FIG. 1 in response to movement by the vehicle operator among P, R, N, D, L range positions of a gear selector located in the passenger compartment. The positions correspond to Park, Reverse, Neutral, Drive and Low ranges of the transmission.

Friction elements of the transmission, clutches and brakes, are hydraulically-actuated elements, whose alternate engagement and disengagement connect and disconnect, respectively, components of the planetary gearsets of the automatic transmission. As the components are connected and released, the various gear ratios of the transmission are produced. The forward clutch 32 is engaged whenever the transmission is required to produce forward drive, including the D and L ranges. The forward clutch is disengaged whenever the transmission is required to operate in any of the other ranges.

When the manual valve moves to the forward drive state, land 14 moves rightward from the position of FIG. 1, thereby opening, through valve 10, a connection between the line pressure source 20 and a passage 40. The forward clutch 32 communicates with passage 40 through an orifice 36. Another hydraulic passage 38 connects orifice 36 and forward clutch 32.

When the manual valve is in the neutral state of FIG. 1, or land 14 moves leftward from the position of FIG. 1 to the reverse state, the connection between the line pressure source 20 and passage 40 is closed, and a connection through passages 38 and 40, ports 42 and 44, and passage 26 is opened to the source of exhaust pressure 24.

Figure 2:
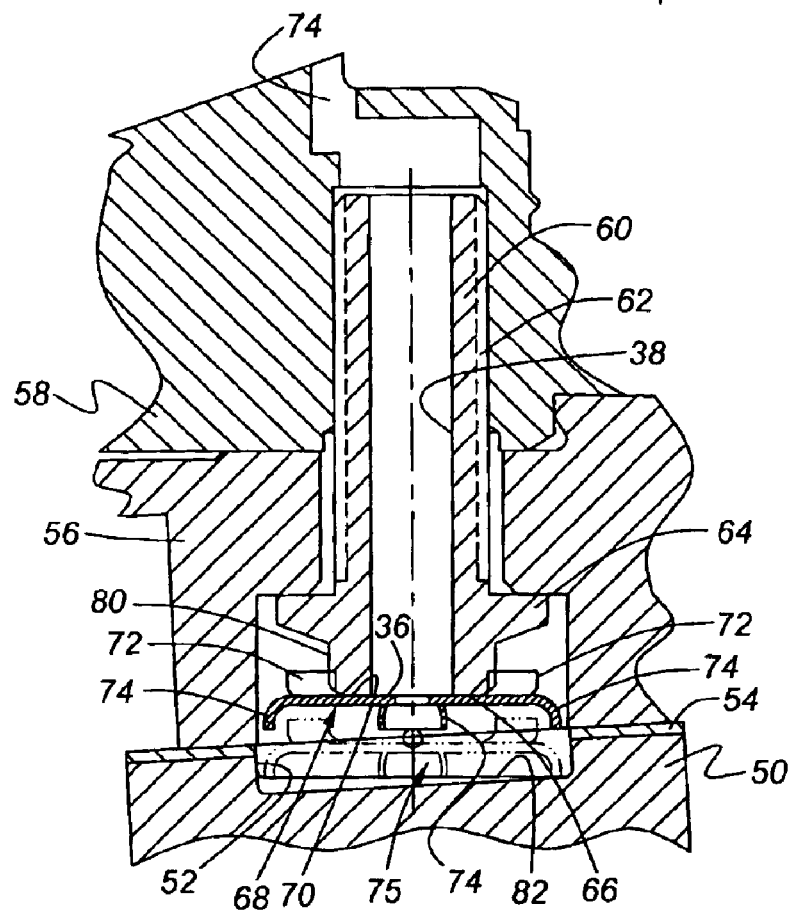
FIG. 2 is a cross section showing the orifice plate in the clutch stroking position. The phantom line show the orifice plate in the destroking position.

Referring now to FIG. 2, a solenoid body assembly 50 defines a recess 52, surrounded by a gasket 54, located adjacent a transmission case 56. A center support 58, a structural component connected to the case 56, is formed with internal screw threads that are engaged by external screw threads on the outer surface of a tube 60. The tube shank 62 engages screw threads tapped into the center support 58. The tube 60 is formed with a head 64, which contacts the surface of the case 56 when the tube is installed in the transmission assembly. The head 64 is formed with a planar surface 66, which provides a seat on which an orifice plate 68 contacts the tube head. Orifice plate 68 is formed with a surface 70, which contacts the seat 66 at the head of the tube. The shank of the tube is formed with the longitudinal passage 38, through which hydraulic fluid enters the forward clutch 32 from chamber 75 and exits the forward clutch through chamber 75.

Figure 3:
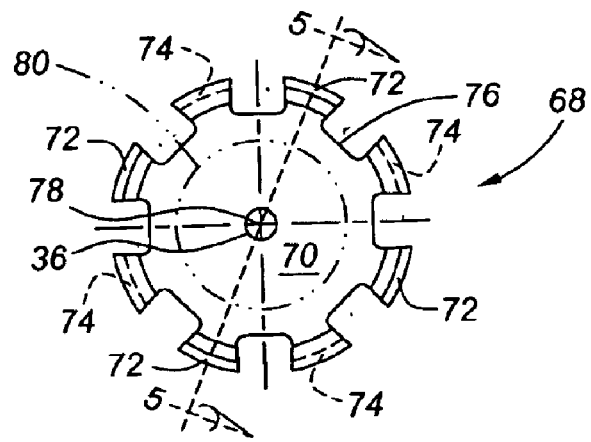
FIG. 3 is a front view of an orifice plate according to the present invention.
Figure 4:
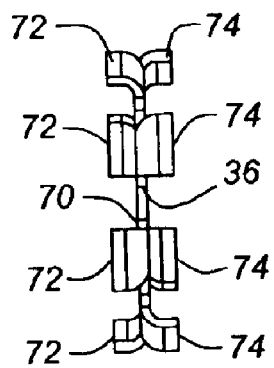
FIG. 4 is a side view of the orifice plate of FIG. 3.
Figure 5:
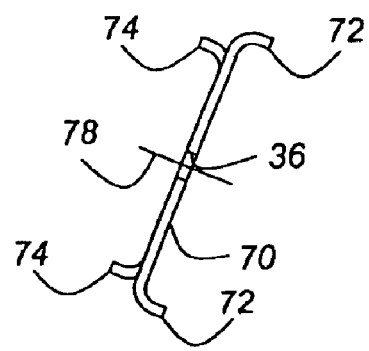
FIG. 5 is a cross section taken at plane 5—5 of FIG. 3.

Referring now to FIGS. 3–5, orifice plate 68 is formed preferably of sheet 1010 steel (SAE J403 1008), whose thickness is 0.76±0.06 mm. Orifice plate 68 has a centrally located, circular orifice 36 formed through its thickness. The diameter of the orifice is in the range 22.73–22.99 mm.

The orifice 36 is surrounded by a flat sheet surface 70, which contacts and becomes seated on the surface 66 of the tube head 64. The surface 70 is surrounded by four flanges 72, turned axially in a first direction normal to surface 70, and four other flanges 74 turned axially in the opposite direction. Located between each of the flanges 72, 74 is an opening 76, spaced angularly about the central axis 78 of the orifice plate from other openings. Each opening 76 extends radially toward the central axis 78 and circumferentially about the axis.

Chamber 75 connects passage 38 alternately to the line pressure source and to the sump depending on the position of the manual valve spool 12. Orifice plate 68, located within chamber 75, moves into contact with surface 66 and away from that surface depending in the direction of fluid flow to and from the forward clutch 32. In operation, when the valve spool 12 moves to the forward drive position, the line pressure source 20 is open to chamber 75, and surface 70 of orifice plate 68 is forced into contact with the surface 66 of the head 64. This contact provides a seal against the passage of fluid into passage 38 other than through orifice 36. The diameter of orifice 36 is sized to control the rate of fluid flow into passage 38 and to the forward clutch 32. Flanges 72 are located so that they surround the outer cylindrical surface 80 and the tube head 64 and are guided by surface 80 to a position where the orifice is substantially aligned with passage 38.

When the position of the manual valve spool 12 is changed to a position other than the drive position, a hydraulic connection between forward clutch 32 and the low pressure sump 24 is opened through the manual valve 10. Fluid flows from clutch 32 through passage 38, chamber 75, passage 40, ports 42, 44, and passage 26 to the sump 24, the exhaust pressure source. When this occurs, fluid flowing from passage 38 forces orifice plate 68 away from contact with surface 66, and the flanges 74 approach or contact stop surface 82, which is located at the opposite end of chamber 75 from the location of the tube head 64. Fluid exiting the forward clutch through passage 38 flows past orifice plate 68 by flowing through the angularly spaced openings 76 located between the flanges 72, 74. Because flanges 74 contact surface 82, the openings 76 are held away from contact with surface 82. This permits free, unobstructed fluid flow from clutch 32.

Because openings 76 are closed by contact of the orifice plate on the tube head when fluid flows into clutch 32, orifice 36 meters the entire volume of flow into the clutch. It provides the only path for fluid to flow into the clutch. But when the flow direction reverses, orifice 36 combines with the openings 76 to provide multiple paths for fluid to flow from the clutch. The orifice does not meter flow in the reverse direction. Therefore, orifice 36 functions as a metering device when the forward drive range is selected and fluid flows in a first direction, the orifice plate unseats when another drive range is selected and fluid flows in the opposite direction, and it is ready to reseat when forward drive range is reselected and the flow direction reverses again.

The terms "clutch," "brake" and "friction element" are used to interchangeably to refer to a hydraulically or pneumatically actuated device that releasably connects rotating components by producing frictional contact upon the application of hydraulic or pneumatic pressure and releases the components for free rotation upon venting pressure from the device. The terms "hydraulic" and "pneumatic" are used interchangeably to refer to fluid in either the liquid or gaseous state.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

We claim:

1. A system for controlling the rate at which fluid flows to an engaging clutch and for quickly disengaging the clutch, comprising:
   a source of pressurized hydraulic fluid;
   a manually operated valve hydraulically connected to the fluid source for alternately opening and closing communication through the valve between the fluid source and the clutch;
   a seat located in a fluid flow path between the valve and the clutch; and
   a plate moveable by fluid flow in a first direction into contact with the seat and moveable by fluid flow in a second direction away from the seat, the plate having an orifice through which fluid enters the clutch when the plate contacts the seat, and openings through which fluid flowing from the clutch passes when the plate is away from the seat.

2. The system of claim 1, further comprising:
   a tube located between the plate and the clutch, including a head adjacent the plate and formed with the seat, a shank having a passage hydraulically communicating with the clutch, the orifice being aligned with the passage when the plate contacts the seat.

3. The system of claim 1, wherein
   the tube head is formed with a guide surface; and
   the plate is formed with first flanges directed from the surface toward the tube, spaced angularly around the orifice, and surrounding the guide surface when the plate contacts the seat.

4. The system of claim 1, further comprising:
a stop surface facing and spaced from the seat for limiting movement of the plate away from the seat; and wherein
the plate is formed with second flanges directed from the surface toward the stop surface and spaced angularly around the orifice.

5. The system of claim 1, further comprising:
a stop surface facing and spaced from the seat for limiting movement of the plate away from the seat; and wherein
the plate is formed with first flanges directed from the surface toward the tube and spaced angularly around the orifice, and second flanges directed from the surface toward the stop surface and spaced angularly around the orifice.

6. The system of claim 1, further comprising:
a stop surface facing and spaced from the seat for limiting movement of the plate away from the seat; and wherein
the tube head is formed with a guide surface; and
the plate is formed with first flanges directed from the surface toward the tube and spaced angularly around the orifice, surrounding the guide surface when the plate contacts the seat, and second flanges directed from the surface toward the stop surface and spaced angularly around the orifice.

7. The system of claim 1, further comprising:
a low pressure source; and wherein
the valve is hydraulically connected to the low-pressure source, and the valve alternately opens and closes communication through the valve between the low-pressure source and the clutch.

8. The system of claim 1, further comprising:
a stop surface facing and spaced from the seat for limiting movement of the plate away from the seat;
a low pressure source; and wherein
the valve is hydraulically connected to the low-pressure source, and the valve alternately opens and closes communication through the valve between the low-pressure source and the clutch.

9. An orifice device in a hydraulic control system for controlling the rate at which fluid flows in a first direction and for permitting rapid flow in a second direction, comprising:
a passage surrounded by a seat located in a fluid flow path; and
a plate moveable by fluid flow into contact with the seat and moveable by fluid flow away from the seat, the plate having an orifice through which fluid enters the passage when the plate contacts the seat, and openings through which fluid flowing from the passage passes when the plate is away from the seat.

10. The orifice device of claim 9, further comprising:
a tube formed with the passage and including the seat located between the plate and the passage, the orifice being aligned with the passage when the plate contacts the seat.

11. The orifice device of claim 9, wherein
the plate is formed with first flanges directed toward the passage, spaced angularly around the orifice.

12. The orifice device of claim 9, further comprising:
a stop surface facing and spaced from the seat for limiting movement of the plate away from the seat; and wherein
the plate is formed with second flanges directed toward the stop surface and spaced angularly around the orifice.

13. The orifice device of claim 9, further comprising:
a stop surface facing and spaced from the seat for limiting movement of the plate away from the seat; and wherein
the plate is formed with first flanges directed from the surface toward the passage and spaced angularly around the orifice, and second flanges directed from the surface toward the stop surface and spaced angularly around the orifice.

14. The orifice device of claim 9, further comprising:
a tube formed with the passage and including the seat located between the plate and the passage, the orifice being aligned with the passage when the plate contacts the seat, the tube including a head formed with a guide surface;
a stop surface facing and spaced from the seat for limiting movement of the plate away from the seat; and wherein
the plate is formed with first flanges directed from the surface toward the tube and spaced angularly around the orifice, surrounding the guide surface when the plate contacts the seat, and second flanges directed from the surface toward the stop surface and spaced angularly around the orifice.

15. An orifice device in a hydraulic control system for controlling the rate at which fluid flows in a first direction and for permitting rapid flow in a second direction, comprising:
chamber containing a seat and a stop surface spaced from the seat;
a plate located in the chamber, moveable by fluid flow into contact with the seat and moveable by fluid flow away from the seat, the plate having an orifice through which fluid passes in the first direction when the plate contacts the seat, and openings through which fluid flowing through the orifice passes in the second direction when the plate is away from the seat.

16. The orifice device of claim 15, further comprising:
a tube formed with a passage and including the seat located between the plate and the passage, the orifice being aligned with the passage when the plate contacts the seat.

17. The orifice device of claim 15, wherein
the plate is formed with first flanges directed toward the seat, spaced angularly around the orifice.

18. The orifice device of claim 15 wherein the plate is formed with second flanges directed toward the stop surface and spaced angularly around the orifice.

19. The orifice device of claim 15 wherein the plate is formed with first flanges directed from the surface toward the passage and spaced angularly around the orifice, and second flanges directed from the surface toward the stop surface and spaced angularly around the orifice.

20. The orifice device of claim 15, further comprising:
a tube formed with a passage and including the seat located between the plate and the passage, the orifice being aligned with the passage when the plate contacts the seat, the tube including a head formed with a guide surface; and wherein
the plate is formed with first flanges directed from the surface toward the tube and spaced angularly around the orifice, surrounding the guide surface when the plate contacts the seat, and second flanges directed from the surface toward the stop surface and spaced angularly around the orifice.

* * * * *